US007384256B1

(12) United States Patent
Clark

(10) Patent No.: US 7,384,256 B1
(45) Date of Patent: Jun. 10, 2008

(54) SCREW FEEDER FOR ROLLER COMPACTOR MACHINE

(75) Inventor: James Alan Clark, Marion, IA (US)

(73) Assignee: Vector Corporation, Marion, IA (US)

( * ) Notice: Subject to any disclaimer, the term of this patent is extended or adjusted under 35 U.S.C. 154(b) by 413 days.

(21) Appl. No.: 11/103,941

(22) Filed: Apr. 12, 2005

(51) Int. Cl.
*B29C 47/24* (2006.01)
*B29C 47/34* (2006.01)

(52) U.S. Cl. ...................... 425/224; 425/206; 425/208; 425/363; 425/448

(58) Field of Classification Search ................ 425/203, 425/206, 208, 224, 363, 448
See application file for complete search history.

(56) References Cited

U.S. PATENT DOCUMENTS 3,269,611 A * 8/1966 Komarek .................... 222/190
3,781,151 A * 12/1973 Harris ........................ 425/145
3,938,434 A 2/1976 Cox
4,111,626 A * 9/1978 Funakoshi et al. .......... 425/203
4,415,336 A 11/1983 Stasi
4,871,449 A 10/1989 Lott
5,122,263 A 6/1992 Huber
5,558,433 A * 9/1996 Gheorghita ................ 366/76.4
6,513,424 B1 2/2003 Iwasaki

FOREIGN PATENT DOCUMENTS

EP 0 554 964 A1 8/1993

* cited by examiner

*Primary Examiner*—Robert Davis
*Assistant Examiner*—Joseph Leyson
(74) *Attorney, Agent, or Firm*—McKee, Voorhees & Sease, P.L.C.

(57) ABSTRACT

A screw feeder is provided for a powder roller compactor machine. The machine includes a hopper for holding powder and a pair of rollers for compacting the powder. A screw feeder transfers powder from the hopper to the rollers. The screw feeder includes an upper tapered section with a tapered shaft and a lower straight section with a straight shaft. Auger flighting is provided on the tapered and straight sections of the screw feeder. The auger flighting preferably has a fixed depth along the length of the screw feeder.

12 Claims, 3 Drawing Sheets

SCREW FEEDER FOR ROLLER COMPACTOR MACHINE

BACKGROUND OF THE INVENTION

A roller compactor is a well known densification and dry granulation machine for powdered material. The roller compactor produces uniform compacted sheets from powder, with consistent hardness and increased density. The roller compactor compacts powdered material between two rollers under pressure. The compacted powdered sheets can then be used for manufacturing free flowing granules for automatic packaging of products, compact granules for reduced product packing sizes, and granules for high speed tableting or encapsulation, with consistent dust-free purity and size.

In a conventional roller compactor machine, powder material is fed into a hopper and is pre-compacted with a screw feeder in the hopper. The screw feeder than delivers the powder to the rollers. The screw feeder normally is either a fully straight screw or a fully tapered screw, both of which have advantages and disadvantages. A fully straight screw enhances even distribution of the powder onto the compacting rollers. A fully tapered screw enhances pre-compaction and de-aeration of the powder within the hopper.

It is desirable to have a roller compactor machine having the benefits of both the straight screw and tapered screw.

Accordingly, a primary objective of the present invention is the provision of a roller compactor machine having an improved screw feeder.

Another objective of the present invention is the provision of a screw feeder for a roller compactor machine wherein the screw has both a tapered section and a straight section.

A further objective of the present invention is the provision of an improved screw feeder for a roller compactor machine wherein the screw has a tapered shaft and a straight shaft, with constant depth flighting on the shafts.

Still another objective of the present invention is the provision of an improved screw feeder for a roller compactor machine which is economical to manufacture, and durable and safe in use.

These and other objectives will become apparent from the following description of the invention.

BRIEF SUMMARY OF THE INVENTION

An improved screw feeder is provided for a roller compactor machine. The screw feeder is mounted inside the hopper of the machine, and has an upper tapered section and a lower straight section. The tapered section has opposite upstream and downstream ends, with a tapered shaft narrowing from the upstream end to the downstream end. The straight section of the screw feeder has a straight shaft. Auger flighting extends along the tapered shaft and straight shaft, and has a constant depth or width along the length of the screw feeder.

DETAILED DESCRIPTION OF THE PREFERRED EMBODIMENT

Figure 1:
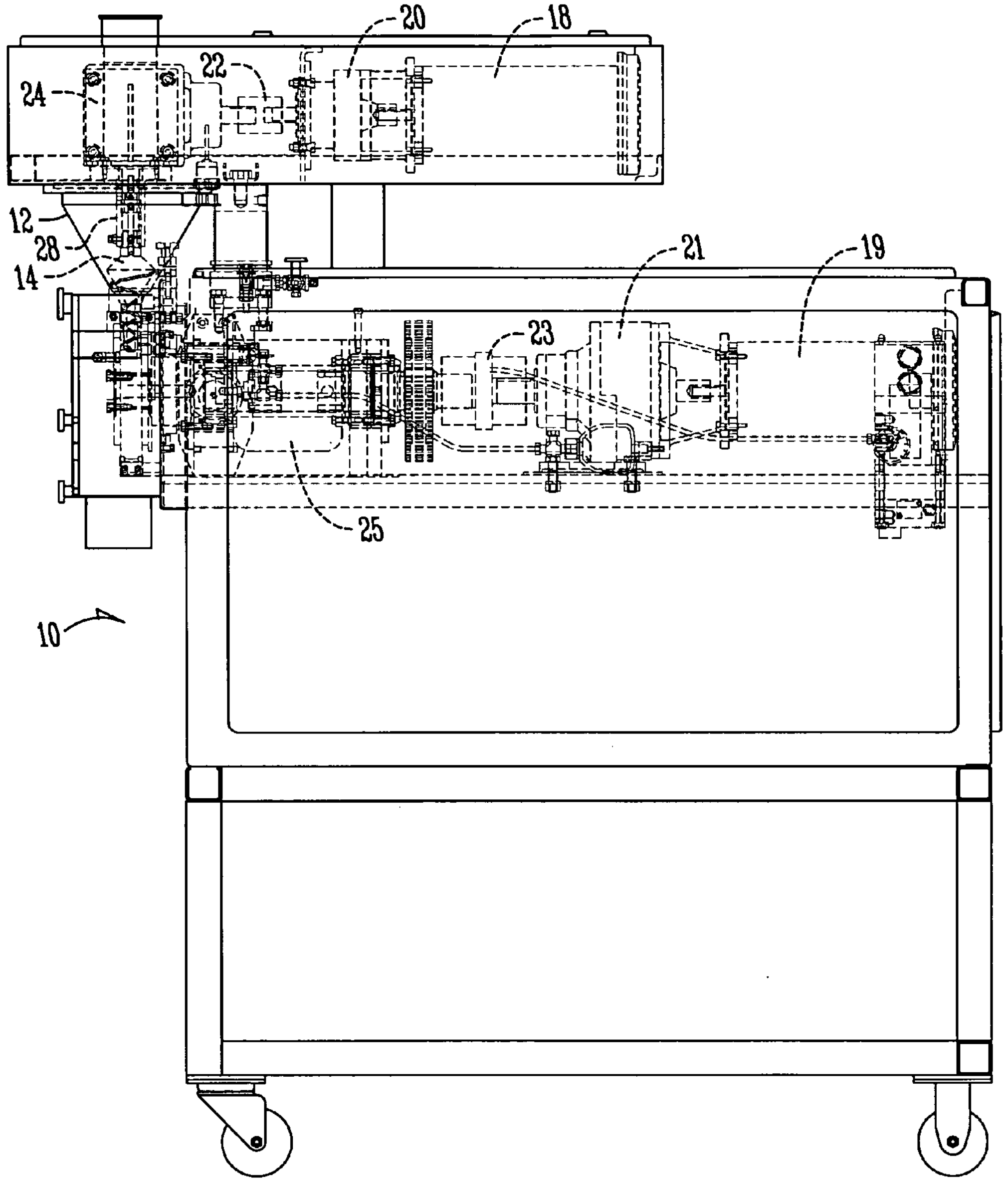
FIG. 1 is a side elevation view of a roller compactor machine having the improved screw feeder of the present invention.
Figure 2:
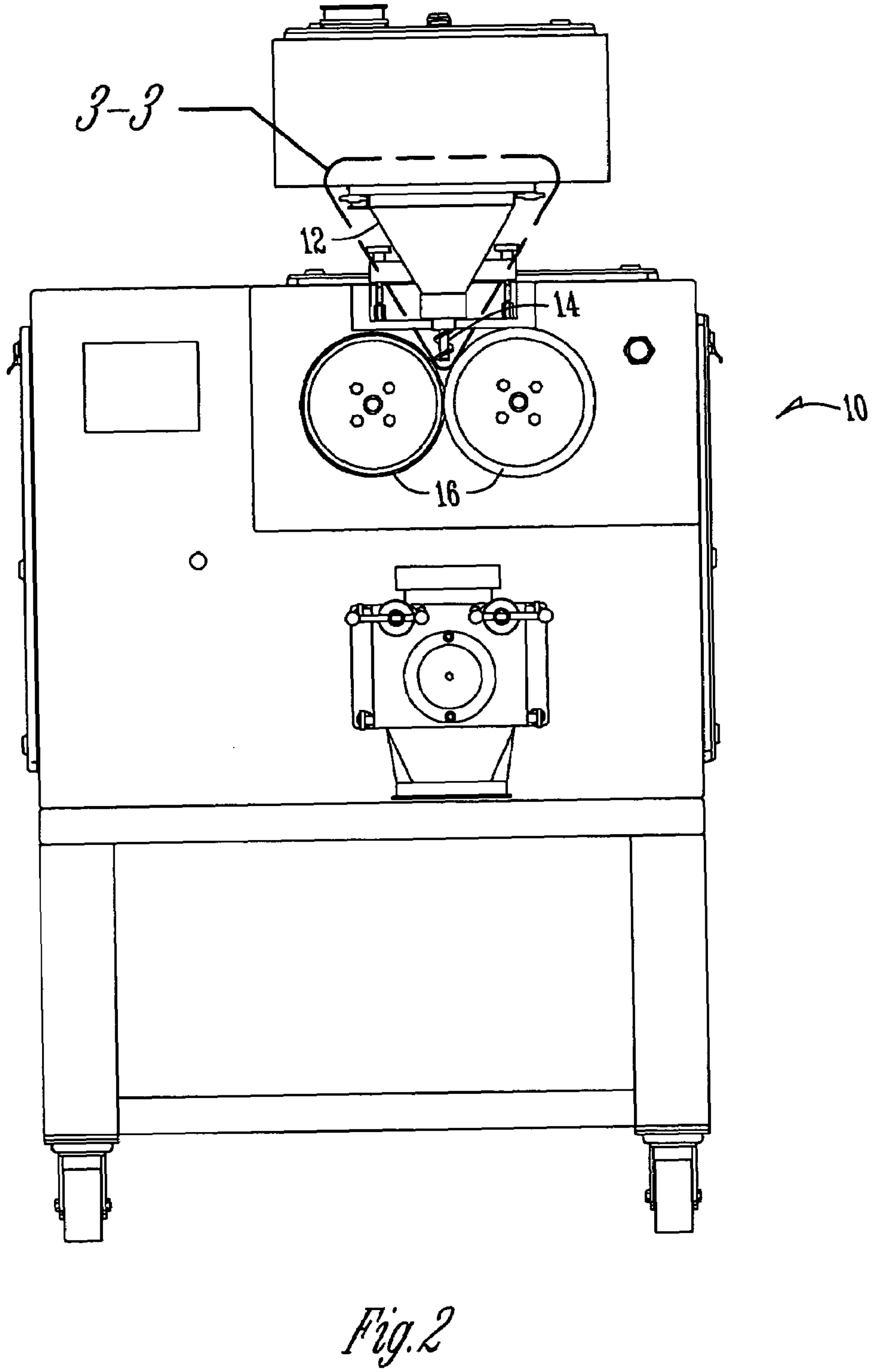
FIG. 2 is an end elevation view of the roller compactor machine having the improved screw feeder of the present invention.

A roller compactor machine is generally designated in the drawings by the reference numeral 10. The machine 10 includes a hopper 12 with a screw feeder 14 therein to feed powdered material from the hopper 12 to a pair of compacting rollers 16.

The machine 10 includes a drive train for the screw feeder 14 and a drive train for the compacting rollers 16. The respective drive trains generally include motors 18, 19, speed reducers 20, 21, flex couplers 22, 23, and gear box 24, and drive shaft 25. The drive trains are conventional and do not constitute a part of the present invention.

The present invention is directed towards the screw feeder 14. The screw feeder 14 includes an upper hub 26 which is operatively connected to the gear box 24 via a coupler 28. Actuation of the screw feeder drive train turns the screw feeder 14 via the coupler connection between the gear box 24 and the screw feeder 14.

Figure 3:
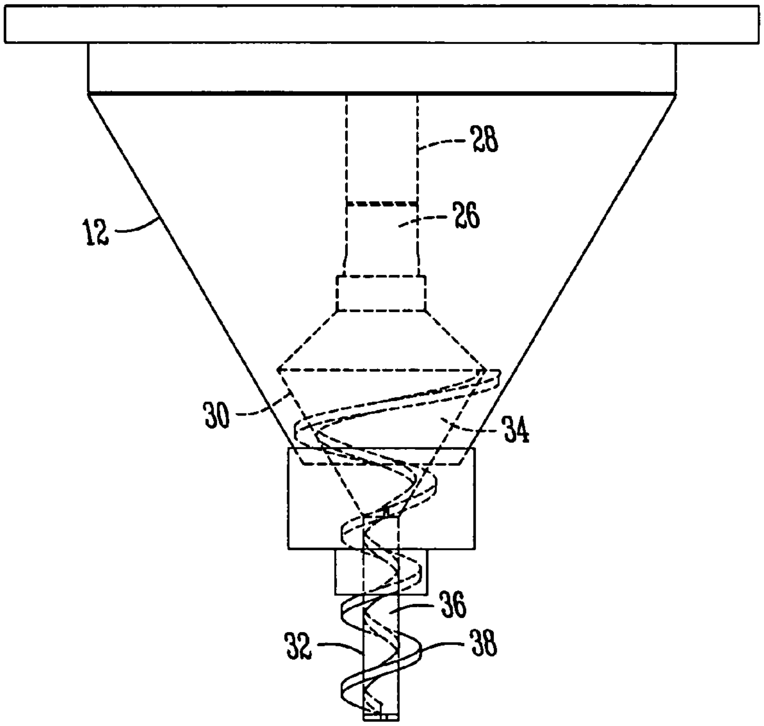
FIG. 3 is an enlarged view taken along lines 3-3 of FIG. 2.
Figure 4:
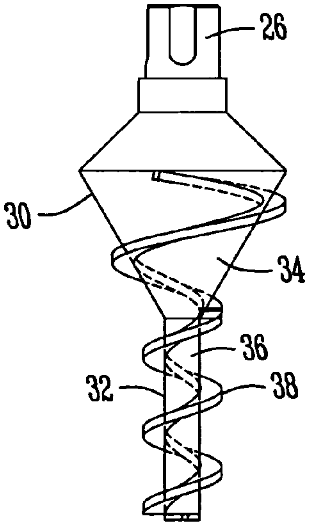
FIG. 4 is a side elevation view of the improved screw feeder of the present invention.

As best seen in FIGS. 3 and 4, the screw feeder 14 includes an upper tapered section 30 and a lower straight section 32. The tapered section 30 includes a tapered shaft 34 which narrows from an upstream end to a downstream end. In a preferred embodiment, the angle of the tapered shaft 34 is approximately 30°. The straight section 32 includes a straight shaft 36 extending out of the hopper 12. Auger flighting 38 is connected to the shafts 34, 36 along the length of the screw feeder 14. Preferably, the flighting has a constant depth along its full length. As shown in FIGS. 3 and 4, the auger flighting extends along the tapered shaft of the tapered section for more than 360° and along the straight section for more than 360°, and the flighting on the straight section resides outside the hopper along a portion of its length.

In use, the tapered section 34 of the screw feeder 14 pre-compacts and de-aerates the powder within the hopper 12. The straight section 32 of the screw feeder 14 evenly distributes the powder across the faces of the compacting rollers 16. If desired, a scraper, such as a multi-sided star shaped scraper, can be provided on the lower end of the straight section 32 of the screw feeder 14 to further enhance the distribution of powder across the faces of the rollers 16.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved roller compactor machine having rollers for compacting powdered material, and a hopper for feeding the material to the rollers, the improvement comprising:

- a screw feeder mounted inside the hopper and having an upper tapered section, and a lower straight section;
- the tapered section having upstream and downstream ends and a tapered shaft with a diameter being greater at the upstream end than the downstream end;
- auger flighting extending along the tapered shaft of the tapered section for more than 360° and along the straight section for more than 360°.

2. The improved machine of claim 1 wherein the flighting has a substantially constant depth along the tapered section.

3. The improved machine of claim 1 wherein the auger flighting on the straight section of the screw feeder has substantially constant depth.

4. The improved machine of claim 3 wherein the depth of the flighting on the tapered and straight sections are substantially equal in depth.

5. The improved machine of claim 1 wherein the tapered shaft narrows at approximately a 30° angle from the upstream end to the downstream end.

6. The improved machine of claim 1 wherein the tapered section of the screw feeder is within the hopper and the straight section of the screw feeder extends out of the hopper.

7. A powder roller compactor machine, comprising:

a hopper for holding powder;

a pair of rollers for compacting powder;

a screw feeder for transferring powder from the hopper to the rollers;

the screw feeder having a shaft with a tapered section within the hopper and a straight section extending out of the hopper;

the screw feeder having flighting on the shaft sections; and the flighting on the straight section residing outside the hopper along a portion of its length.

8. The compactor machine of claim 7 wherein the tapered shaft section narrows from an upstream end to a downstream end.

9. The compactor machine of claim 7 wherein the flighting has a fixed depth.

10. The compactor machine of claim 7 wherein the tapered shaft section tapers at an angle of approximately 30°.

11. The improved machine of claim 1 wherein a portion of the straight section of the screw feeder resides outside the hopper.

12. The compactor machine of claim 7 wherein the flighting extends more than 360° on each feeder section.

* * * * *